United States Patent [19]
Sugiyama

[11] Patent Number: 6,075,468
[45] Date of Patent: Jun. 13, 2000

[54] ANGLE INFORMATION INPUT APPARATUS

[75] Inventor: Keiichi Sugiyama, Kazo, Japan

[73] Assignee: Wacom Co., Ltd., Saitama-Ken, Japan

[21] Appl. No.: 09/076,894

[22] Filed: May 13, 1998

[30] Foreign Application Priority Data

May 14, 1997 [JP] Japan ..................................... 9-139354

[51] Int. Cl.⁷ .................................................. G06T 17/40
[52] U.S. Cl. ................................................. 341/5; 345/437
[58] Field of Search ........................ 341/5, 20; 345/156, 345/163, 164, 167, 437; 340/710, 365 R; 346/164

[56] References Cited

U.S. PATENT DOCUMENTS 4,878,553  11/1989  Yamanami et al. .
5,466,896  11/1995  Murakami et al. .
5,956,045   9/1999  Gotoh et al. ............................. 345/473

*Primary Examiner*—Brian Young
*Assistant Examiner*—John Nguyen
*Attorney, Agent, or Firm*—Finnegan, Henderson, Farabow, Garrett & Dunner, L.L.P.

[57] ABSTRACT

An angle information input apparatus has a main unit and a rotator. The main unit forms a peripheral portion of the input apparatus and has a first position-designating portion. The rotator is rotatable within the main unit and has a second position-designating portion. The input apparatus thus inputs any given angle information according to two positions which are respectively designated by the first and second position-designating portions placed on a tablet. Both first and second position-designating portions are displaced from the center position of the rotator. The distance between the first position-designating portion and the center position of the rotator is different from the distance between the second position-designating portion and the center position of the rotator. Accordingly, angle information is input only when the rotator is rotated, but it is not input when the input apparatus itself is merely moved.

9 Claims, 4 Drawing Sheets

ANGLE INFORMATION INPUT APPARATUS

BACKGROUND OF THE INVENTION

1. Field of the Invention

The present invention relates to an angle information input apparatus for inputting angle information by designating at least two positions in relation to a coordinate input tablet.

2. Description of the Related Art

FIGS. 1A and 1B are respectively a plan view and a sectional view of a known angle information input apparatus. The input apparatus is formed, as illustrated in FIGS. 1A and 1B, in a cylindrical shape having a predetermined height. The apparatus is formed of a main unit 10 having a hollowed-out center and a rotator 20. The rotator 20 fits completely in the hollowed center of the main unit 10 and is smoothly rotated therein without any play by application of a force. The main unit 10 has a bottom surface, and the rotator 20 is thus prevented from dropping even if the main unit 10 is lifted.

The main unit 10 and the rotator 20 are concentrically formed around the center axis O, and the rotator 20 is rotated around the center axis O within the main unit 10 by inserting a finger into a disc-like indentation 30 that is formed on the upper surface of the rotator 20 and by orbiting the indentation 30.

Provided at the center bottom of the main unit 10 is a first position-designating portion (tuning circuit) 40 of a first tuning frequency f1, which is formed of a circular coil and a capacitor and the center of which matches the center axis O. Only the position of the coil is shown by the dotted circle. The center point of the coil, i.e., the intersection between the center axis O and the bottom of the main unit 10 is indicated by O'.

Provided at the bottom of the rotator 20 is a second position-designating portion (tuning circuit) 50 of a second tuning frequency f2 (f2 is not equal to f1), which is formed of a circular coil and a capacitor. The second position-designating portion 50 is displaced from the rotating axis of the rotator 20, i.e., from the center axis O. This displacement prevents the first and second position-designating portions 40 and 50 from overlapping with each other in any situation under which the rotator 20 is rotated. The second position-designating portion 50 orbits around the first position-designating portion 40 in such a manner that it moves on a circular arc having a predetermined radius.

A tablet used with this known input apparatus is of the type which is able to detect the positions designated by at least the first and second position-designating portions (having the different tuning frequencies f1 and f2) 40 and 50. Such a tablet is already known and an explanation thereof is thus omitted. A method for inputting angle information into a host computer (more precisely, application software) by using the above type of tablet is, for example, as follows.

FIG. 2 illustrates the first and second position-designating portions 40 and 50 located on the input area of the tablet, the lower left corner of which is determined to be the origin (O, O). The positions $(X_1, Y_1)$ and $(X_2, Y_2)$ respectively designated by the first and second position-designating portions 40 and 50 detected by the tablet are input via a predetermined interface into a tablet driver (software) installed in the computer. The tablet driver then calculates the following angle according to the foregoing two positions (coordinates), $$\text{Angle:} \quad \theta = \tan^{-1} \frac{Y_2 - Y_1}{X_2 - X_1}$$

and sends the calculated angle to the application software. Then, the application software is run based on the angle information received from the tablet driver (see FIGS. 2 and 3). It is now assumed that the second position-designating portion 50 orbits around the first position-designating portion 40 by rotating the rotator 20, as shown in FIG. 4, from the original position indicated by the dotted circle to the position represented by the solid circle. The angle $\alpha_1$ is the angle between the horizontal line and the line joining the original position of the second position-designating portion 50 with the first position-designating portion 40, and the angle $\alpha_2$ is the angle between the horizontal line and the line joining the new position of the second position-designating portion 50 with the first position-designating portion 40. According to the above equation, angles $\alpha_1$ and $\alpha_2$ may be separately input as absolute angles into the application software. Alternatively, a change $\Delta\theta$ in the angle $\alpha_2 - \alpha_1$ obtained by moving the second position-designating portion 50 may be input.

The input apparatus is adapted to input the angle information while being placed on the input area of the tablet. Accordingly, the tablet driver calculates the angle only from the positions designated by the two position designating-portions 40 and 50 which are located on the tablet. Thus, disadvantageously, angle information may be input into the tablet driver even when the input apparatus itself is moved on the tablet rather than the rotator 20. This is explained in detail below with reference to FIG. 5.

It is now assumed that the first position-designating portion 40 is shifted, as shown in FIG. 5, from the position indicated by the dotted circle to the position indicated by the solid circle, by moving the input apparatus located on the input area of the tablet. The angle of the second position-designating portion 50 in relation to the center of the first designating-portion 40 prior to the shifting is indicated by $\alpha_1$, while the angle of the second position-designating portion 50 in relation to the center of the first designating-portion 40 subsequent to the shifting is represented by $\alpha_2$. Then, the driver tablet inputs these angles $\alpha_1$ and $\alpha_2$ as absolute angles or as a change in the angle $\alpha_2 - \alpha_1$ into the application software even though the second position-designating portion 50 (the rotator 20) has not orbited.

One method to overcome the above drawback may be to constantly monitor a change in the position of the first position-designating portion 40 by the tablet driver and to prevent the input of the angle information obtained when the first position-designating portion 40 moves. However, this does not satisfy the need in which the input apparatus is moved to a given position on the tablet to input angle information.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

An object of the present invention is to provide an angle information input apparatus which prevents the input of unnecessary angle information.

Another object of the present invention is to provide an angle information input apparatus which inputs angle information only when a rotator is moved, and which does not input angle information when the input apparatus is merely moved on an input area of a tablet.

In order to achieve the above objects, according to the present invention, there is provided an input apparatus for indicating position information on a graphics tablet. The input apparatus comprises a support member having a first position indicating device and a rotation member having a second position indicating device, the rotation member and the support member being in rotatable contact, the first position indicating device being offset from the center of the support member, and the second position indicating device being offset from the center of the support member.

In order to achieve the above objects, according to the present invention, there is also provided an angle information input apparatus including a main unit and a rotator. The main unit forms a peripheral portion of the input apparatus and has a first position-designating portion. The rotator is rotatable within the main unit and has a second position-designating portion. The input apparatus thus inputs any given angle information according to two positions which are respectively designated by the first and second position-designating portions placed on a tablet. Both first and second position-designating portions are displaced from the center position of the rotator. The distance between the first position-designating portion and the center position of the rotator is different from the distance between the second position-designating portion and the center position of the rotator.

According to the above-described input apparatus, the distance between the first position-designating portion and the second position-designating portions changes when the rotator is rotated. In other words, unless the rotator is rotated, the distance between the first and second position-designating portions remains unchanged.

Accordingly, even if there is a change in angle information, the tablet driver determines that this change is not caused by rotating the rotator and prohibits the angle information from being input into application software unless the distance is changed.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

DESCRIPTION OF THE PREFERRED EMBODIMENT

According to the present invention, a position pointing device has two position indicating elements both of which are offset from the center of the position pointing device.

Figure 1A:
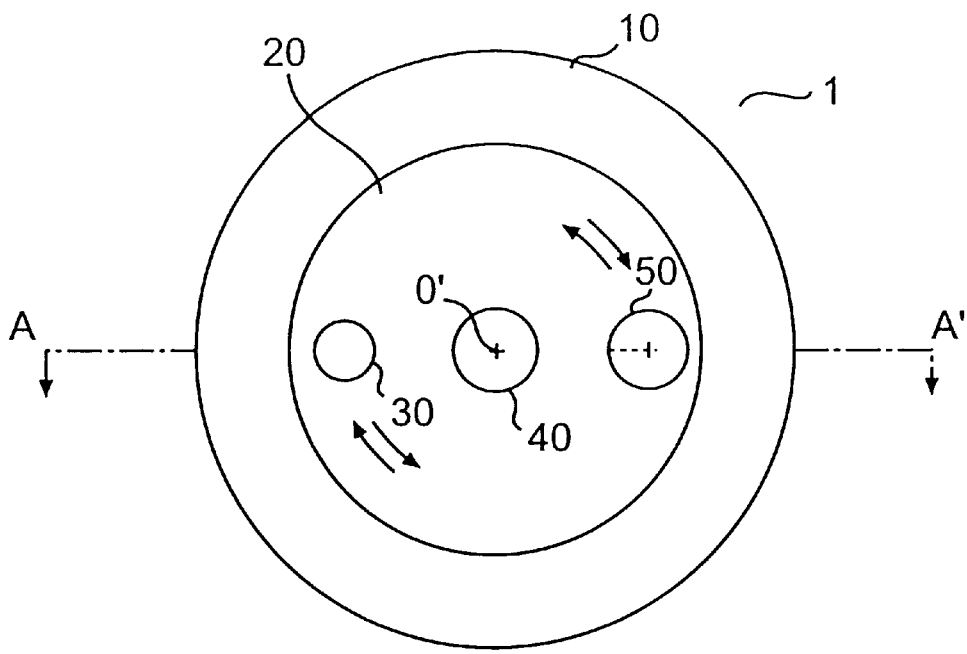
FIG. 1A is a plan view illustrating a known angle information input apparatus.
Figure 1B:
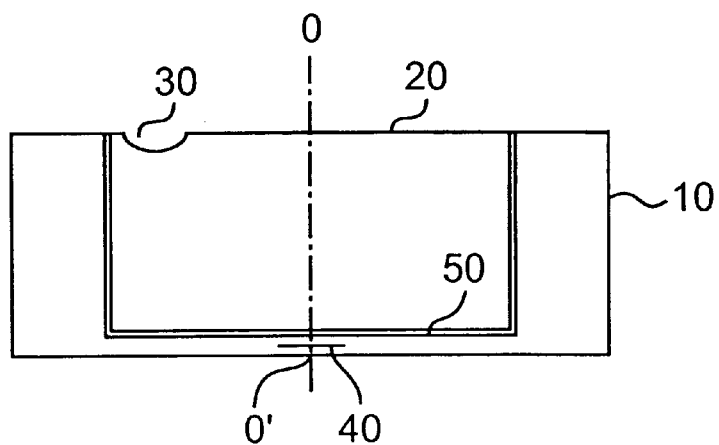
FIG. 1B is a sectional view along line A–A' of FIG. 1A.
Figure 2:
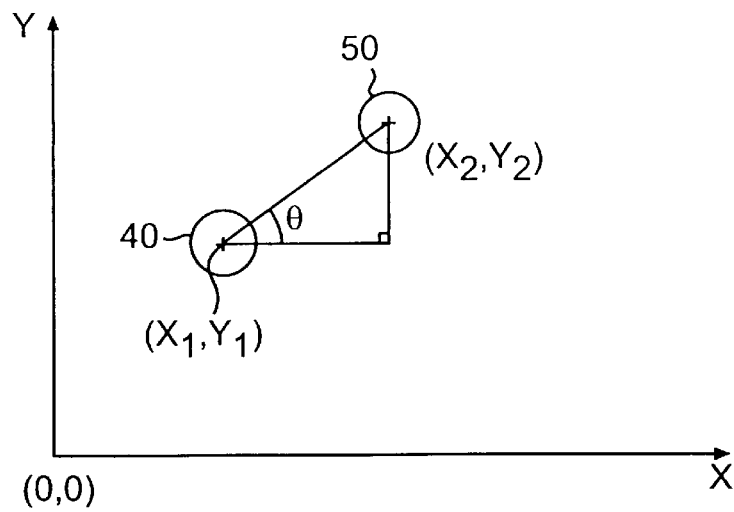
FIG. 2 illustrates the relationship of the positions designated by a first position-designating portion and a second position-designating portion to the input angle θ.
Figure 3:
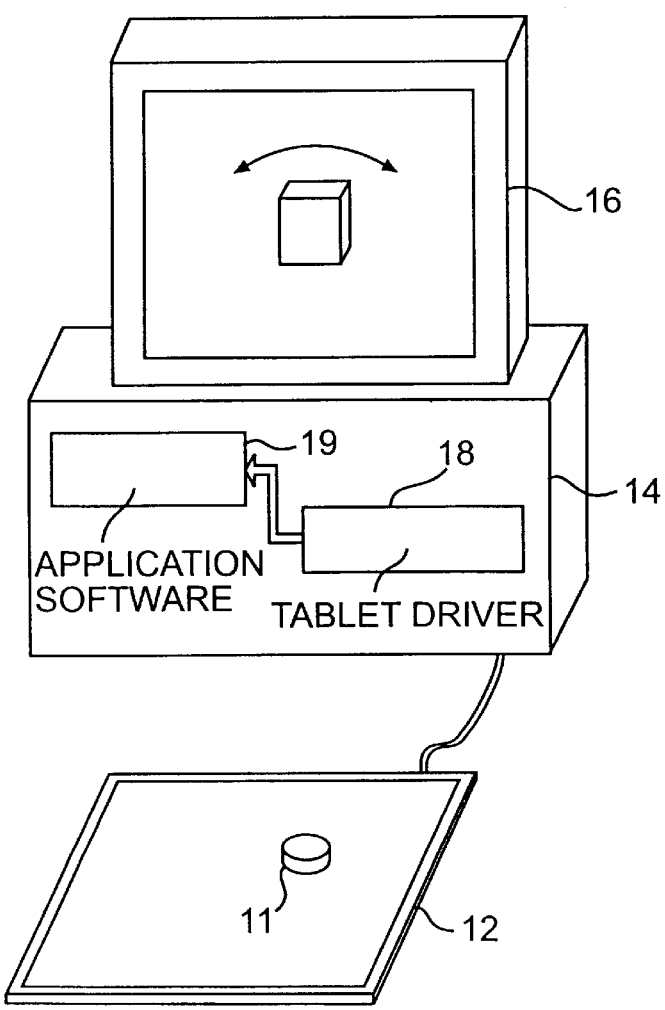
FIG. 3 is a schematic view illustrating a system for which an angle information input apparatus is used.
Figure 4:
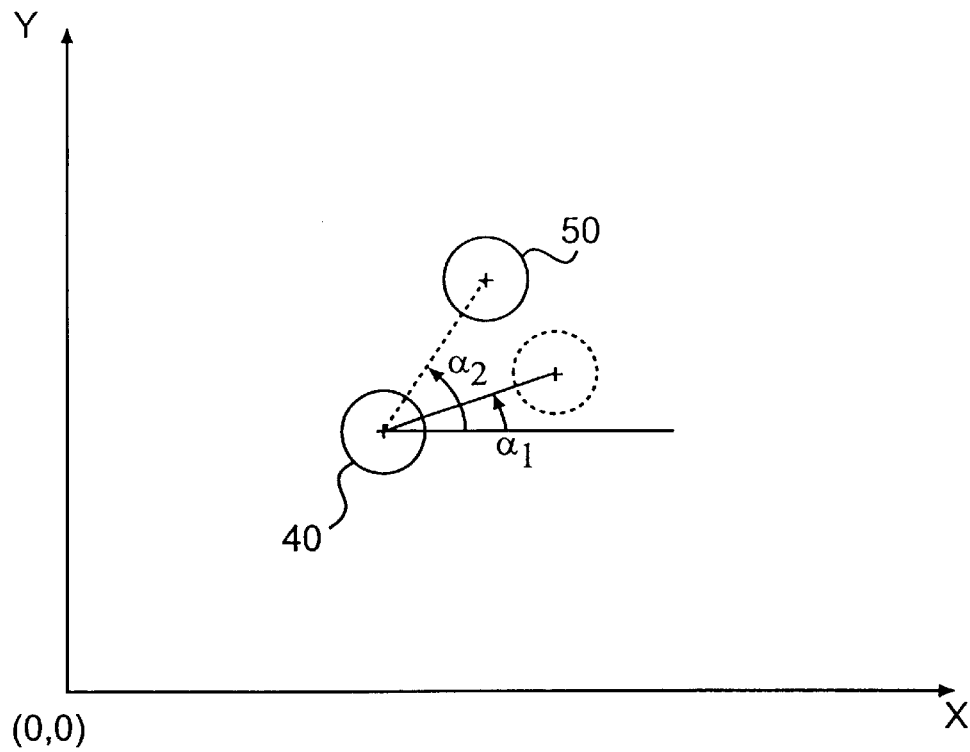
FIG. 4 illustrates a change in angle information obtained by orbiting the second position-designating portion.
Figure 5:
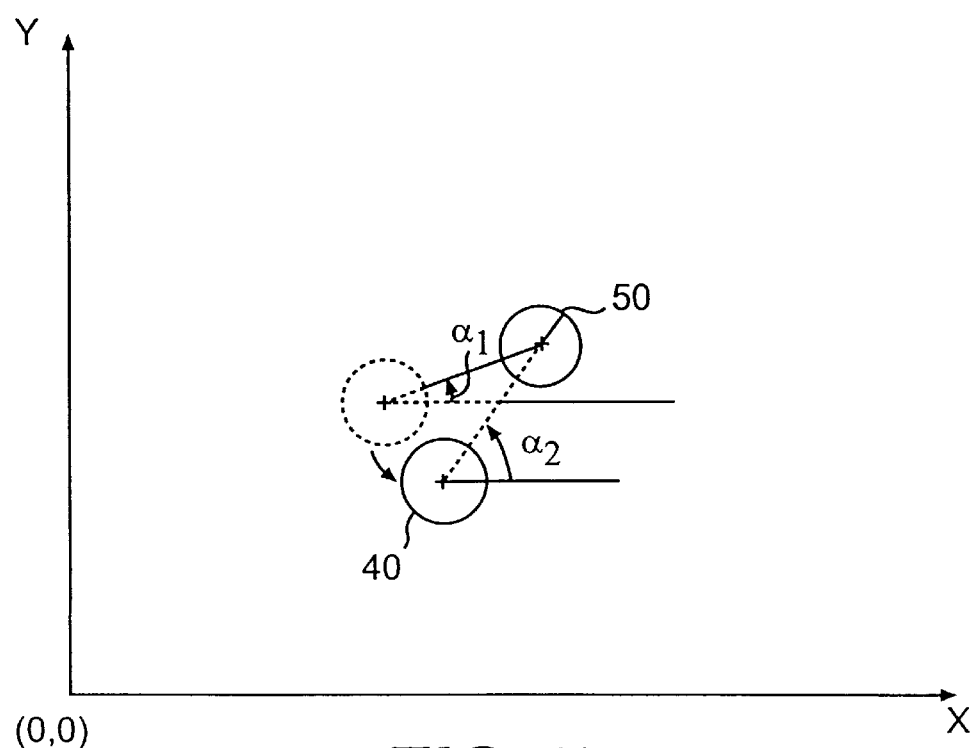
FIG. 5 illustrates a change in angle information caused by moving the first position-designating portion.

The present invention is embodied in a position pointing device used with an associated graphics tablet. The position pointing device inputs information such as graphics or a drawing by tracing on the graphics tablet. Examples of position pointing devices and graphics tablets are disclosed in U.S. Pat. Nos. 4,878,553 and 5,466,896, the disclosures of which are hereby incorporated by reference. In addition, FIG. 3 shows an angle information input apparatus 11 on a tablet 12. The tablet sends information to a computer 14 connected to a display 16. The computer 14 contains software such as a tablet driver 18 and an application program 19.

An angle information input apparatus according to an embodiment of the present invention is described below with reference to the plan view of FIG. 6.

Figure 6:
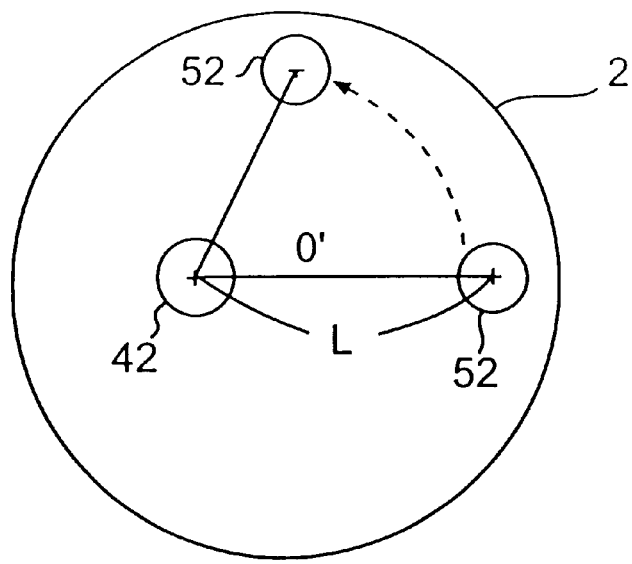
FIG. 6 illustrates the positional relationship between a first position-designating portion and a second position-designating portion used in an angle information input apparatus according to the present invention.

FIG. 6 shows an angle information input apparatus generally indicated by 2. For convenience in explanation, only the positional relationship between a first position-designating portion 42 and a second position-designating portion 52 is shown.

According to this embodiment, the first position-designating portion 42 is displaced from the center axis O on the bottom surface of the main unit of the apparatus. The second position-designating portion 52 orbits around the center axis O. As in the conventional input apparatus, a tablet driver calculates angle information according to the coordinates of the first and second position-designating portions 42 and 52 received from the tablet.

The tablet driver constantly monitors the distance L between the two position-designating portions 42 and 52 by calculating the two positions designated by the portions 42 and 52. If the angle determined by the positions of the two position-designating portions 42 and 52 changes by merely moving the main unit of the input apparatus rather than the rotator, the distance L remains unchanged. Conversely, when the rotator rotates to move the second position-designating portion 52, the distance L noticeably changes. Accordingly, the tablet driver inputs angle information into the application software only when the distance L changes.

According to the configuration of this embodiment, it is possible to prevent the input of angle information when the input apparatus moves along the input area of the tablet without rotating the rotator 20. If the second position-designating portion 52 orbits by rotating the rotator 20 after the input apparatus has been moved, the angle information is then input.

Figure 7:
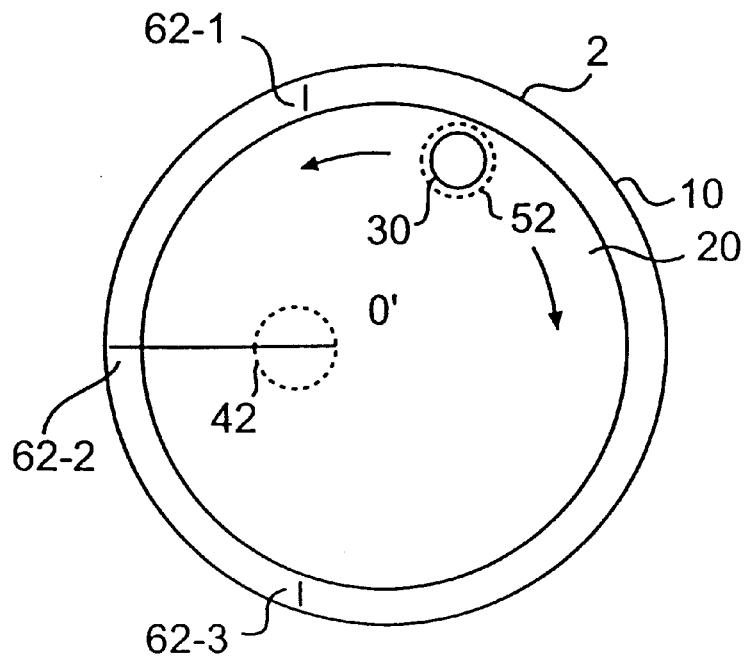
FIG. 7 is a plan view illustrating an angle information input apparatus according to the present invention.

Marks 62 on the upper surface of the peripheral portion of the input apparatus (for example, three marks 62-1 through 62-3, as illustrated in FIG. 7) suggest the position of the first position-designating portion 42. An indentation 30 for receiving a finger is provided in the rotator 20 at a position above the second position-designating portion 52, thereby enabling the operator to assess the position of the second position-designating portion 52. The operator is therefore able to roughly measure the angle to be input into the application software while assessing the rough positions of the first and second position-designating portions 42 and 52 (see FIG. 7).

According to the input apparatus of the present invention, when the second position-designating portion 52 is shifted counter-clockwise from the position near the mark 62-1 (or 62-3) to the position in the vicinity of the mark 62-3 (or 62-1) via the mark 62-2, a change of 180° in the input angle occurs. When the second position-designating portion 52 is shifted clockwise making a long detour from the position near the mark 62-1 (or 62-3) to the position in the vicinity of the mark 62-3 (or 62-1) not via the mark 62-2, a change of 180° in the input angle also occurs. In other words, the operator may select a shorter path (shorter circular arc) or a longer path (longer circular arc) in inputting the same change in the angle. This enables the operator to speedily input rough angle information by selecting a shorter circular arc and to input precise and subtle angle information by taking a longer circular arc along which input angles are easily adjustable.

As is seen from the foregoing description, the angle information input apparatus of the present invention has a main unit and a rotator. The main unit forms a peripheral portion of the input apparatus and has a first position-designating portion. The rotator is rotatable within the main unit and has a second position-designating portion. The input apparatus thus inputs angle information according to two positions which are designated by the first and second position-designating portions placed on the tablet. Both first and second position-designating portions are displaced from the center position of the rotator. The distance between the first position-designating portion and the center position of the rotator is different from the distance between the second position-designating portion and the center position of the rotator. With this arrangement, even if the input apparatus is moved on the input area of a tablet, the distance between the positions designated by the first and second position-designating portions remain unchanged unless the rotator is rotated. Thus, even if the tablet driver receives from the tablet a change in the angle information, it prohibits the angle information from being input into application software unless the distance is also changed.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An angle information input apparatus comprising:
    a main unit forming a peripheral portion of said angle information input apparatus and having a first position-designating portion; and
    a rotator rotatable within said main unit and having a second position-designating portion, wherein said angle information input apparatus inputs angle information according to two positions designated by said first position-designating portion and said second position-designating portion placed on a tablet,
    wherein said first position-designating portion and said second position-designating portion are displaced from a center position of said rotator, and the distance between said first position-designating portion and the center position of said rotator is different from the distance between said second position-designating portion and the center position of said rotator.

2. An angle information input apparatus according to claim 1, wherein said rotator is provided with means for easily rotating said rotator with a finger.

3. An angle information input apparatus according to claim 2, wherein said means comprises an indentation formed in an upper surface of said rotator.

4. An angle information input apparatus according to claim 1, wherein said main unit having a mark indicating a position of said first position-designating portion, and said rotator having an indentation into which a finger is fit to rotate said rotator and which is located above said second position-designating portion.

5. An input apparatus for indicating position information on a graphics tablet, the input apparatus comprising:
    a support member having a first position indicating device; and
    a rotation member having a second position indicating device, the rotation member and the support member being in rotatable contact, the first position indicating device being offset from the center of the support member, and the second position indicating device being offset from the center of the support member.

6. An input apparatus according to claim 5, wherein the first position indicating device is a first distance from the center of the support member and the second position indicating device is a second distance from the center of the support member, the first distance being different from the second distance.

7. An input apparatus according to claim 5, wherein the input apparatus and the graphics tablet communicating through induction.

8. An input apparatus according to claim 7, wherein the first position indicating device comprises a conductive coil.

9. An input apparatus according to claim 8, wherein the second position indicating device comprises a conductive coil.

* * * * *